Jan. 19, 1937.　　P. J. BERGGREN　　2,068,258

FILM GATE STRUCTURE FOR MOTION PICTURE MACHINES

Original Filed Dec. 20, 1928　　2 Sheets-Sheet 1

Per Johan Berggren
INVENTOR.

BY Darby & Darby
ATTORNEYS

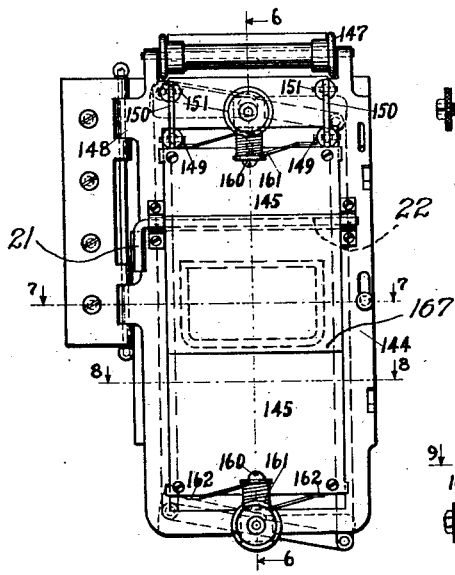

Patented Jan. 19, 1937

2,068,258

UNITED STATES PATENT OFFICE 2,068,258

FILM GATE STRUCTURE FOR MOTION PICTURE MACHINES

Per Johan Berggren, New York, N. Y.

Original application December 20, 1928, Serial No. 327,200. Divided and this application May 5, 1933, Serial No. 669,519. Renewed July 2, 1936

7 Claims. (Cl. 88—17)

This invention relates to motion picture machines and with particularity to improvements in film gates for such machines.

An object of the invention is to provide means which are simple and efficient for supporting and retaining a motion picture film steadily and stationarily in position opposite the aperture while the pictures are being projected therethrough.

A further object is to provide means to engage, center and hold steadily and firmly the portion of the film that extends opposite the projection apertures while the picture is being projected, thereby avoiding movement, buckling or other accidents of the film, and consequent flickering of the projected picture.

A still further object is to provide an improved film gate mechanism for motion picture projecting machines.

Other objects will be apparent after a consideration of the following detail descriptions and the appended claims.

The invention consists substantially in the construction, combination, location, organization and relative arrangement of parts, all as will be more fully hereinafter set forth, as illustrated in the accompanying drawings and finally pointed out in the appended claims.

Referring to the drawings;

Fig. 5 is a view in elevation of the outer face of the gate and its carrying frame;

Fig. 6 is a vertical central sectional view of the gate and its frame taken along the line 6—6 of Fig. 5;

Fig. 7 is a horizontal sectional view taken along the line 7—7 of Fig. 5;

Fig. 8 is another horizontal sectional view taken along the line 8—8 of Fig. 5;

Fig. 9 is a sectional view taken along the line 9—9 of Fig. 6.

Figure 1:
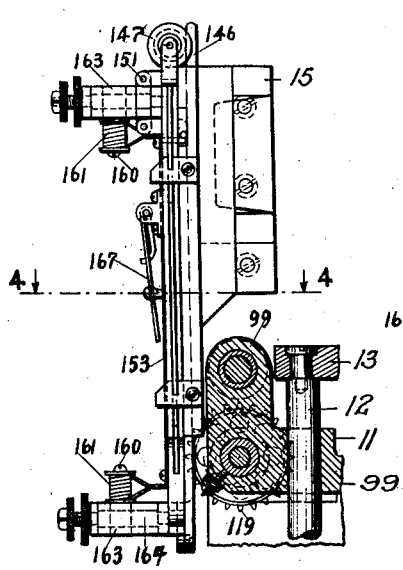
Figure 1 is an end view in elevation showing the improved film gate structure according to the invention.

The invention will be described as applied to a motion picture machine of the type disclosed in application Serial No. 327,200 to which reference may be had for a detail description of the various mechanisms thereof not disclosed in detail herein.

The gate structure embodying my invention includes a gate frame 144, a front aperture plate 145, and a rear aperture plate 146. The gate frame 144 is hinged at one vertical edge thereof to a stationary part of the machine the hinge axis being vertical, as indicated at 148, Figs. 2 and 5, and carries the film guide 147 at its upper end. The front aperture plate 145 is suspended at its upper corners by means of a pivot shaft 149 which is in turn suspended at its ends in links 150, depending from the ends of a pivot rod 151 mounted at the upper end of the gate frame. This front aperture plate 145 is preferably made in two portions 152, 153 placed in flatwise relation to, but offset away from each other.

The chambers or spaces thus formed between the gate portions 152, 153 are filled with a suitable heat insulating material 154. The two gate members are provided with registering openings 155 which form the gate aperture 155.

The rear or back aperture plate 146 is carried by a bracket, which is bolted to the main frame of the machine, and consequently is held stationary and is formed with an aperture 156, which registers with the aperture 155.

Figure 4:
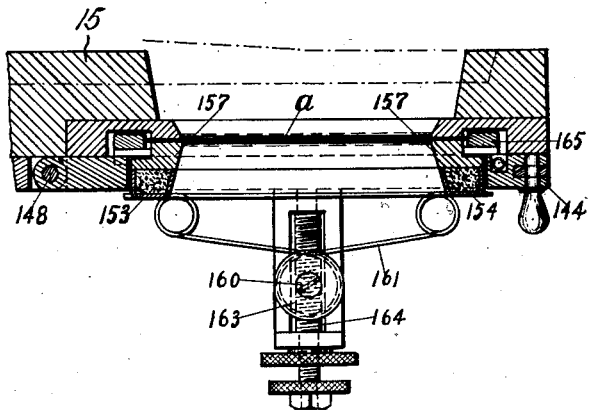
Fig. 4 is a horizontal sectional view taken along the line 4—4 of Fig. 1.

The film a, see Fig. 4, passes between the opposed faces of the front and back aperture plates, and it is among the purposes of my invention to provide means whereby the film, or that portion thereof which occupies the space between the front and back aperture plates, is efficiently held against danger of lateral or sidewise movement, particularly while the pictures thereon are being projected. To accomplish this, without danger of injuring the picture surface of the film, I construct the opposing faces of the said plates in substantial duplicates of each other, and in such manner that the film is supported at its edges outside of the picture surface thereof, not only at the borders of the aperture but also for a considerable distance above and below the aperture. To this end I provide the said plates with vertical side edges, the opposing surfaces of which are slightly raised above the surface of the bodies of the plates, as clearly indicated at 157. I also provide said plates with transverse raised surfaces 158, of a similar character forming boundary edges immediately above and below the aperture. These latter transverse raised surfaces, however, preferably are not raised quite as high above the surfaces of the bodies of the plates as are the vertical side edges, thereby avoiding injury to the field of the pictures on the film. The edging portions of the film outside the field of the pictures are thus disposed between the raised surfaces of the vertical edge portions of the plates, and as these extend throughout the lengths of the plates, and this means for a considerable distance both above and below the aperture, it will be seen that I provide a very efficient support which holds the film firmly and insures steadiness thereof while the pictures thereon are being projected. This is a particularly desirable result where a wide and comparatively heavy film is employed, and enables the front aperture plate to be firmly pressed with equalized pressure throughout the border of that portion of the film which occupies the gate.

In order to effect the evenly distributed pressure of the front aperture plate, I provide adjustable tension devices at the upper and lower ends thereof. In the embodiment of this idea as shown, I provide studs 160, about each of which is coiled a spring 161, the ends of which extend in opposite directions transversely across the plate and have bearing contact with the plate in transverse grooves 162 formed in the plate. The studs 160 are carried by blocks 163 through which operate adjusting screws 164, by means of which the studs may be moved towards and from the gate to adjust the tension exerted on the latter by said springs.

The usual parallel side guide lazy bars 165, with tension spring 166, are provided to afford edge stop guides for the film tape, and to compensate for shrinkage in the width of the film. There is also employed the usual safety or fire shutter 167, which is automatically operated and controlled through rod and link connections 168, from the gearing which drives the projection shutter. One of the connections 168 is actuated by a disc member 180 to which it is pivoted, see Fig. 6, said member 180 being driven by centrifugally actuated shoes 181, connected to a shaft 182 which is driven by the gearing which drives the projection shutter.

A link connection 168 is pivotally connected to a short link 16 which is in turn pivotally mounted on a bracket 17 secured to the supporting member 15. The supporting member 15 is attached to the housing of the projector (not shown) and serves to support the gate structure. The link 16 has a rod extension 18 upon which is adjustably mounted a counterweight 19. Extending from the pivotal connection between the links 168 and 16 is a rod 20 which passes through the gate plates into engagement with the finger 21 of the shaft 22 upon which the fire shutter 167 is pivotally supported. This apparatus operates the fire shutter automatically in accordance with well known principles in this art so that the fire shutter moves out of the path of light when the machine is running and moves down to the position shown in Figures 5 and 6 when the machine stops.

The gate structure above described not only affords a most efficient holder for the film and serves to maintain the latter stationary and free from movement which might otherwise cause flicker or movement of the projected picture on the screen, but it also is of such structure as to prevent the creeping or traveling of flame in case the exposed part of the film occupying the aperture should become ignited from any cause. As disclosed in application Serial No. 327,200 the gate is used in conjunction with a novel type of intermittent feed mechanism comprising sprocket wheels 119 and a Geneva movement 128, 129.

Figure 2:
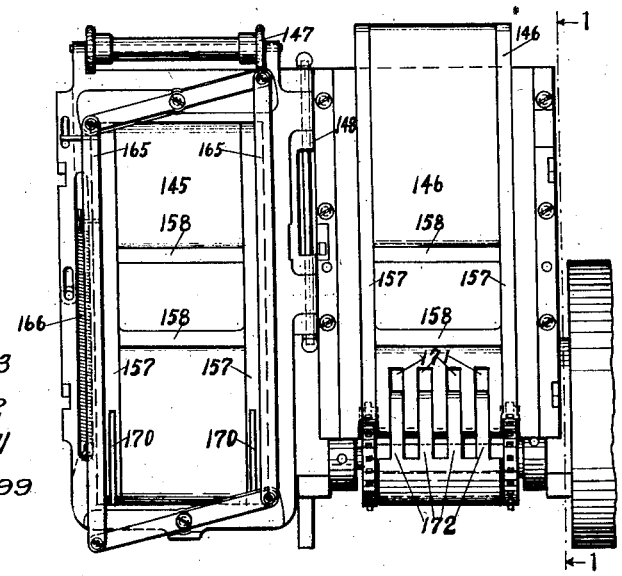
Fig. 2 is a view of the inner face of the gate and frame in opened position showing the inner stationary plate.
Figure 3:
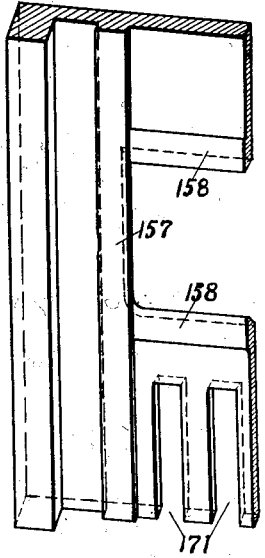
Fig. 3 is a partial detail perspective view showing a portion of the lower end of the inner fixed plate of the gate.

In order to permit the vertical adjustment of the intermittent feed mechanism when required for adjusting the picture in proper framed relation with respect to the aperture, I form the lower portion of the front aperture plate 145, with vertical slots 170, see Fig. 2, which accommodate the intermittent sprocket wheel 119 which is mounted for vertical adjustment in frame 99. The frame 99 is moved and guided by the structure illustrated in Figures 6 and 9. The frame 99 has the hub members through which the fixed guide rods 12 pass. The guide rods 12 are connected at their upper ends by means of a yoke 13 to a threaded rod 14 which passes through the frame 99. This threaded rod 14 may be manually operated by mechanism not shown so as to cause the frame 99 to move up and down, guided by the rods 12. In order to afford a solid substantial backing support for the film throughout its entire width and all the way down to the point where the film is engaged by the intermittent feed sprockets, and at whatever height the latter may be adjusted, I provide the lower portion of the back aperture plate with vertical slots 171 in which are received the cooperating fingers 172 on the vertically adjustable frame 99 which carries the intermittent feed mechanism.

This application is a division of application Serial No. 327,200, filed December 20, 1928.

What is claimed is:

1. In a motion picture apparatus a film gate having an aperture, a frame in which said gate is carried, means for pivotally supporting the gate at the top in said frame, and pressure devices engaging the upper and lower ends of the gate adjacent the corners thereof.

2. In a motion picture apparatus a film gate having an aperture, a frame in which said gate is carried, links for pivotally supporting the gate from its upper edge from the frame, pressure devices engaging the upper and lower ends of the gate adjacent the corners thereof and means for adjusting the tension of said tension devices.

3. In a motion picture apparatus a gate frame, a gate suspended in said frame, links pivotally connected to the frame and near the upper edge of the gate for suspending the gate in the frame, and tension devices at the upper and lower ends of the gate, said tension devices engaging the plate adjacent the respective upper and lower corners thereof.

4. In a motion picture apparatus a gate frame, a gate suspended from its upper edge only in said frame and tension devices at the upper and lower ends of the gate, said tension devices engaging the plate adjacent the respective upper and lower corners thereof and means for adjusting the tension of said tension devices.

5. In a motion picture apparatus, a gate frame, a gate suspended by links in said frame, studs carried by the frame adjacent the upper and lower ends of the gate, an adjusting screw for each stud, a spring coiled upon each of said studs, the ends of said spring bearing against the gate at points adjacent the opposite corners thereof.

6. In a motion picture apparatus, a gate frame, a gate suspended therein from the top by links, studs carried by the frame adjacent the upper and lower ends of the gate, an adjusting screw for each stud, a spring coiled upon each of said studs, the ends of said spring bearing against the gate at points adjacent the opposite corners thereof, said gate having grooves in which the ends of said spring engage.

7. In a gate structure for motion picture apparatus, front and rear gate plates having registering apertured openings, all of the boundary edges of said openings being disposed in opposing relation to each other and raised above the surfaces of the body portions of said respective plate members, the top and bottom raised surfaces at each aperture lying in a plane nearer the planes of the surfaces of the body portions of the respective plate members than the planes of the bearing surfaces at the sides of the apertures.

PER JOHAN BERGGREN.